US007309122B2

United States Patent
Nakajima et al.

(10) Patent No.: US 7,309,122 B2
(45) Date of Patent: Dec. 18, 2007

(54) METHOD FOR STORING CATIONIC POLYMERIZABLE COMPOSITION AND CONTAINER FOR USING THEREOF

(75) Inventors: Atsushi Nakajima, Hachioji (JP); Nobumasa Sasa, Sayama (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 396 days.

(21) Appl. No.: 10/870,181

(22) Filed: Jun. 18, 2004

(65) Prior Publication Data

US 2004/0265520 A1 Dec. 30, 2004

(30) Foreign Application Priority Data

Jun. 24, 2003 (JP) ............................. 2003-179474
Sep. 2, 2003 (JP) ............................. 2003-309441

(51) Int. Cl.
*G01D 11/00* (2006.01)
(52) U.S. Cl. .......................... 347/100; 347/96; 347/95
(58) Field of Classification Search ............... 347/100, 347/95, 96, 101, 84, 85, 86; 106/31.6, 31.13, 106/31.27; 523/160
See application file for complete search history.

(56) References Cited

U.S. PATENT DOCUMENTS

| 6,232,361 B1 * | 5/2001 | Laksin et al. ............... 523/160 |
| 6,500,875 B2 | 12/2002 | Noguchi |
| 6,966,645 B2 * | 11/2005 | Takabayashi ............... 347/100 |
| 2003/0190548 A1 * | 10/2003 | Furukawa et al. ........ 430/270.1 |

FOREIGN PATENT DOCUMENTS

| EP | 0 844 255 A1 | 5/1998 |
| EP | 1 243 629 A1 | 9/2002 |

OTHER PUBLICATIONS

European Search Report.

* cited by examiner

*Primary Examiner*—Manish S. Shah
(74) *Attorney, Agent, or Firm*—Finnegan, Henderson, Farabow, Garrett & Dunner, L.L.P.

(57) ABSTRACT

A method for storing a cationic polymerizable composition including an acid generating agent, a cationic polymerizable compound and water, the method including the step of: placing the cationic polymerizable composition in a water impermeable container maintaining a content of water in the cationic polymerizable composition at a level of 0.2-5.0 weight % based on the total weight of the cationic polymerizable composition.

12 Claims, No Drawings

METHOD FOR STORING CATIONIC POLYMERIZABLE COMPOSITION AND CONTAINER FOR USING THEREOF

TECHNICAL FIELD

The present invention relates to a method for storing a cationic polymerizable composition containing an acid generating agent for using as a polymerization initiator, and to a container for using thereof.

BACKGROUND

In recent years, ink-jet recording methods have found wide application in the field of various kinds of graphic arts such as photography, various kinds of printing, marking and specific printing such as color filters due to its ability to form images simply and cheaply. Particularly, it has also become possible to obtain image quality comparable with silver salt photography by utilizing a recording apparatus which ejects and controls minute dots; ink in which color reproduction range, durability and ejection suitability have been improved; and exclusive paper in which ink absorption, color forming property of the colorant and surface gloss have been greatly enhanced. Image quality improvement of current ink-jet recording methods has been achieved only when complete set of a recording apparatus, ink and exclusive paper are employed as a system.

However, an ink-jet system which requires exclusive paper is problematic with respect to limitations of recording media and increased cost of such recording media. Therefore, many attempts have been made to record on a medium, on which ink is to be transferred, differing from exclusive paper by means of ink-jet recording. Specifically, there are phase-conversion ink-jet methods utilizing wax which is solid at room temperature, solvent-type ink-jet methods utilizing an ink which is comprised mainly of a rapid-drying organic solvent, and UV ink-jet methods in which an ink is cross-linked by ultraviolet (UV) light after recording.

Among them, a UV ink-jet method has been noted recently in respect to relatively low odor compared to a solvent-type ink-jet method, rapid drying property and capability of recording on a recording medium without ink absorption property; UV-curable ink-jet ink is disclosed (e.g., Patent Document No. 1.)

However, even when these inks are used, because a dot diameter after an ink impact is largely changed due to the kind of the recording material or the working environment, it is impossible to form the highly minute image onto all the recording materials.

As ultraviolet ray hardenable ink, it is known a radical polymerization type and a cationic polymerizable type.

The cationic polymerizable type is focused because of the following reasons: polymerization reaction is not affected by the presence of an oxygen atom; among employed cationic polymerizable monomers, ionic polymerizable monomers such as oxetane and epoxy compounds emit low amount of smell and show small amount of shrinkage.

The cationically polymerizable type UV ink tends to be affected by humidity since it depends on ionic polymerization utilizing acid generating agents as a catalyst. Further, it results in a problem in which temperature dependency is high due to the fact that activation energy of the reaction is greater than radical reactions.

Commonly, other than the above-mentioned ultraviolet radiation curable type ink-jet ink, cationically polymerizable compositions are widely employed in resist materials, coating materials, and printing inks such as flexographic ink.

Further, employed as acid catalysts are thermally generating type and photo-generating type acid generating agents. Listed as representative compounds are phosphonium salts, sulfonium salts, iodonium salts, and sulfonic acid esters.

Generally, in a cationic polymerization reaction, acid acts as a catalyst. Therefore, when acid is once provided into the system from polymerization initiators, polymerization is induced over an extended period of time due to lack of deactivation, whereby storage stability is very adversely affected. Consequently, the storage stability of the above-mentioned cationically polymerizable compositions becomes a critical problem.

As a method to improve the storage stability of cationically polymerizable compositions, a very effective common method is one in which a small amount of base is previously incorporated as a polymerization inhibitor. However, the following problems have occasionally occurred. The polymerization inhibitors decrease speed. No effects result depending on selection of polymerizable monomers and initiators. Specifically, it is difficult for thermally acid generating type phosphonium salts or photolytically acid generating type iodonium salts to retard thermal acid generation from the initiators. As a result, improvement of the storage stability has been limited. Further, when oxetane compounds are employed as a cationically polymerizable compound monomer, a termination reaction rarely occurs. As a result, problems have occurred in which the viscosity of the cationically polymerizable compositions increases to an extreme due to excessive polymerization.

Further, a photopolymerizable composition in which triarylsulfonium salts are employed as an initiator is the most stable system and is also very useful for ink-jet ink which requires low viscosity as well as high stability. However, even though the triarylsulfonium salts are employed, a high speed polymerizable composition in which oxetane compounds and epoxy compounds are simultaneously used has not resulted in desired storage stability over an extended period.

As noted above, from the aspect of the composition which constitutes cationically polymerizable compositions, trials have been attempted to improve stability, for example, by selecting the type of polymerization initiators. However, desired stability has not been achieved under various environmental conditions.

As a means to improve storage stability of polymerizable compounds, trials have been performed in which by selecting materials of storage containers or the characteristics, effects due to temperature, ambient light, heat, and air during storage are decreased. For example, proposed are (refer, for example, to Patent Documents 1 and 2) a method in which a photosensitive colored resinous composition comprising colorants, binder polymers, photopolymerizable compounds, photopolymerization initiators, and solvents is stored at −10-30° C. upon being vibrated, a method in which, in a storage container, the product of the ratio (being a void ratio) in percent of the void volume to the interior volume of the container and the partial oxygen pressure (hPa) in the gas in the void exceeds the specified conditions, or a method in which storage is carried out in a container which is below the specified light transmittance conditions in the wavelength region of 250-440 nm. However, as a storage method for the cationically polymerizable composition in which cationically polymerizable monomers are employed as a polymerizable monomer and acid generating agents are used as a polymerization initiator, none of these methods have resulted in the desired quality.

In order to overcome the above-mentioned drawbacks, various improvement means have been investigated. For example, disclosed is an actinic radiation curable type ink-jet ink which incorporates cationically polymerizable compounds such as oxetane ring containing compounds (refer, for example, to Patent Documents 3 and 4). However, even in each of the proposed inks, the above-mentioned drawbacks are not sufficiently overcome due to large effects of water incorporated into the ink.

On the other hand, a method for improving the storage stability of ink by the addition of basic compounds is disclosed (refer, for example, to Patent Documents 5 and 6). The inventors of the present invention conducted investigations based on the methods disclosed in Patent Documents 5 and 6. As a result, it was discovered that the storage stability resulted in improvement effects, though the effects were not sufficient, and the curability of the ink was degraded due to the addition of the basic compopunds.

(Patent Document 1)

Japanese Patent Publication Open to Public Inspection (hereinafter referred to as JP-A) No. 2003-107727 (claims)

(Patent Document 2) JP-A No. 2003-149829 (claims)

(Patent Document 3) JP-A No. 2001-220526 (claims)

(Patent Document 4) JP-A No. 2002-188025 (claims)

(Patent Document 5) JP-A No. 2000-186079 (claims)

(Patent Document 6) JP-A No. 2000-327672 (claims)

SUMMARY

In view of the foregoing problems, the present invention was achieved. The object of the present invention is to improve the storage stability of a cationically polymerizable composition over an extended period of time, and specifically to provide a storage method of a cationically polymerizable composition which is useful for ink-jet ink and flexographic ink which require low viscosity as well as minimal viscosity variation, and a storage container employed for the same.

An embodiment of the present invention is a method of placing the cationic polymerizable composition in a container with keeping an amount of water in the container to be in a specified range of weight % based on the total weight of the cationic polymerizable composition.

According to the present invention, it is possible to provide a storage method of an actinic radiation curable type ink-jet ink, in which the photopolymerization, curability, storage stability, ejection stability at nozzles., close adhesion properties onto a recording body, solvent resistance, and water resistance are not adversely affected by variations of temperature and humidity of the ambience where the aforesaid actinic radiation curable type ink-jet ink is stored, and an actinic radiation curable type ink-jet recording apparatus using the same.

Another embodiment of the present invention includes a storage method of the actinic radiation curable type ink-jet ink (hereinafter referred to as the ink-jet ink or the ink) characterized in that an actinic radiation curable ink-jet ink comprising an oxetane ring containing compound is stored in a specified storage container. The storing condition is specified by a specified formula determined by parameters WR, SR, and SR. WR is the moisture content (in percent) of the aforesaid actinic radiation curable ink-jet ink; SR is the ratio (the void ratio) of the vacant space volume which is obtained by deducting the volume occupied by the actinic radiation curable ink from the interior volume of the aforesaid storage container to the interior volume of the aforesaid storage container; and WP is the water vapor pressure (Pa) in the aforesaid vacant space. By achieving the constitution specified in the present invention, it was discovered that a storage method of a actinic radiation curable type ink-jet in was realized in which the photopolymerization, curability, storage stability, ejection stability at nozzles, close adhesion properties onto a recording body, solvent resistance, and water resistance were not adversely affected by variations of temperature and humidity of the ambience where the aforesaid actinic radiation curable type ink-jet ink was stored. The present invention was thus achieved.

DETAILED DESCRIPTION OF PREFERRED EMBODIMENTS

Preferred embodiments of the present invention include the following structures.

(1) A method for storing a cationic polymerizable composition comprising an acid generating agent, a cationic polymerizable compound and water, the method comprising the step of:

placing the cationic polymerizable composition in a water impermeable container maintaining a content of water in the cationic polymerizable composition at a level of at least 0.2 weight % based on the total weight of the cationic polymerizable composition.

(2) The method for storing a cationic polymerizable composition of the present invention, wherein the cationic polymerizable compound is an oxetane compound.

(3) The method for storing a cationic polymerizable composition of the present invention, wherein the container is made of a water impermeable material selected from the group consisting of:

(i) metals;

(ii) glass; and (iii) plastics having a water-vapor permeability of less than or equal to 20 $g/m^2 \cdot 24$ hr measured at 40° C., 90% RH under 1 atmosphere for each plastic having a thickness of 25 µm.

(4) A container for storing a cationic polymerizable composition containing an acid generating agent, a cationic polymerizable compound and water, a content of water in the cationic polymerizable composition being at least 0.2 weight % based on the total weight of the cationic polymerizable composition, wherein the container is made of a water impermeable material selected from the group consisting of:

(i) metals;

(ii) glass (iii) plastics having a water-vapor permeability of less than or equal to 20 $g/m^2 \cdot 24$ hr measured at 40° C., 90% RH under 1 atmosphere for each plastic having a thickness of 25 µm.

(5) The method for storing the cationic polymerizable composition of the present invention, wherein the cationic polymerizable composition is a photo curable ink-jet ink containing a compound having an oxetane ring in the molecule; and the container and the ink-jet ink satisfy the following formula:

$$WP \times WR/SR > 6.65,$$

wherein WR represents a content of water in the ink-jet ink expressed in weight % based on the total weight of the ink-jet ink; SR represents a ratio of a volume of a portion in the container which is not occupied by the ink-jet ink to an inner volume of the container; and WP is a water-vapor pressure (Pa) of the portion in the container which is not occupied by the ink-jet ink.

(6) The method for storing the photo curable ink-jet ink of the present invention, wherein the container and the ink-jet ink satisfy the following formula:

$$WP \times WR/SR > 13.4,$$

wherein WR represents a content of water in the ink-jet ink expressed in weight % based on the total weight of the ink-jet ink; SR represents a ratio of a volume of a portion in the container which is not occupied by the ink-jet ink to an inner volume of the container; and WP is a water-vapor pressure (Pa) of the portion in the container which is not occupied by the ink-jet ink.

(7) The method for storing the photo curable ink-jet ink of the present invention, wherein the water-vapor pressure (Pa) of the portion in the container which is not occupied by the ink-jet ink is determined employing one of the methods of:
 (i) a two-point pressure method;
 (ii) a two-point temperature method;
 (iii) a flow dividing method; or
 (iv) a saturated salt method,
 the methods being defined in JIS B 7920.

(8) The method for storing the photo curable ink-jet ink of the present invention, wherein the photo curable ink-jet ink contains a vinyl ether compound or a compound having an oxirane ring in the molecule.

(9) The method for storing the photo curable ink-jet ink of the present invention, wherein the photo curable ink-jet ink contains a photo cationic polymerizable initiator.

(10) The method for storing the photo curable ink-jet ink of the present invention, wherein the photo curable ink-jet ink contains a pigment and a dispersing agent for the pigment.

(11) The method for storing the photo curable ink-jet ink of the present invention, wherein the pigment comprises microparticles having an average particle diameter of 10 to 150 nm.

(12) The method for storing the photo curable ink-jet ink of the present invention, wherein the photo curable ink-jet ink has a viscosity of 5 to 50 mPa·s at 25° C.

(13) An ink-jet recording apparatus employing the photo curable ink-jet ink stored according to the method of the present invention.

The elements contained in the structures of the present invention will be further detailed below.

The storage method of a cationically polymerizable composition of the present invention refers to the storage method of a cationically polymerizable composition comprising at least an acid generating agent and a cationically polymerizable compound in a storage container. It is characterized that the aforesaid cationically polymerizable composition is stored at a moisture content of at least 0.2 percent by weight.

Further, the storage container of a cationically polymerizable composition of the present invention refers to a storage container which is employed to maintain the cationically polymerizable composition comprising at least an acid generating agent and a cationically polymerizable compound at a moisture content of at least 0.2 percent by weight. It is characterized by being comprised of at least one selected from substantially non-water permeable metal and glass, as well as a plastic material in which water-vapor permeability at a thickness of 25 µm is at most 20 g/m²·24 hours under 40° C., 90 percent relative humidity, and normal pressure.

In view of the foregoing problems, the inventors of the present invention conducted diligent investigations. As a result, it was discovered that when a cationically polymerizable composition was stored over an extended period of time, incorporation of water at the specified amount retarded polymerization reaction during storage, and specifically, water incorporated into the cationically polymerizable composition resulted in no decrease in a photolytic rate for curing during use and was very useful as a polymerization inhibitor during storage over an extended period of time.

Plastic containers comprised of polyethylene and the like, which are generally employed as a storage container of cationically polymerizable compositions exhibit relatively high water permeability. As a result, during storage over an extended period of time, when exposed to an ambience of high temperature, moisture incorporated in the cationically polymerizable composition is released through the walls of the storage container, whereby the equilibrium moisture content of the cationically polymerizable composition decreases. When the moisture content of the cationically polymerizable compositions decreases, cationic polymerization is enhanced due to a minute amount of acid generated in the system, whereby viscosity variations such as an increase in viscosity, gellation, or on the contrary, a decrease in viscosity, result.

In order to overcome the above-mentioned problems, by allowing a storage container to maintain the high moisture resistance specified in the present invention, the release of moisture in the storage container to the exterior is retarded. As a result, even in a system employing acid generating agents, even if a minute amount of acid is generated, storage stability is markedly improved due to the retarding effect of existing water.

Further, even though a storage container of low water-vapor permeability is employed, or even though a cationically polymerizable composition at a state of low moisture content is placed in such a storage container, the moisture content of the cationically polymerizable component remains low. As a result, it is not possible to sufficiently exhibit the desired effects of the present invention. Consequently, by controlling the moisture content of the cationically polymerizable composition to be at least 0.2 percent by weight, it is possible to realize markedly extended storage stability.

Methods for controlling the moisture content of the cationically polymerizable composition to be at least 0.2 percent by weight are not particularly limited. However, preferred methods in the present invention include one in which the moisture content of the cationically polymerizable composition prior to placement in a container is controlled, or another in which when the cationically polymerizable composition is placed in a container, ambient humidity is controlled.

The storage container of the cationically polymerizable composition of the present invention is characterized in being comprised of at least one selected from substantially non-water permeable metal and glass, as well as a plastic material in which water-vapor permeability at a thickness of 25 μm is at most 20 g/m²·24 hours under 40° C., 90 percent relative humidity, and normal pressure. The water-vapor permeability of plastic components is preferably 0.01-20 g/m²·24 hours, and is more preferably 9.01-10 g/m²·24 hours. In the present invention, it is critical that in regard to the storage container, in addition to the main body, a lid at a water-vapor permeability in the range specified as above is used, and the container can be tightly sealed.

It is possible to determine the water-vapor permeability specified in the present invention employing the method specified in JIS Z 0208 or ASTM E96. In these methods, a 25 μm thick strip sample is fixed in a cup provided with a desiccating agent and is allowed to stand in a specified hydrothermostat (in the present invention, 40° C. and 90 percent relative humidity) over the specified time (in the present invention, 24 hours). The difference in the weight of the desiccating agent prior to and after the standing is determined and the moisture absorbed by the desiccating agent is determined.

Further, the storage method of the cationically polymerizable composition of the present invention is characterized in that it is stored at a moisture content of at least 0.2 percent by weight, preferably 0.2-5.0 percent by weight, and still more preferably 0.5-2.0 percent by weight.

It is possible to determine the moisture content of the cationically polymerizable composition according to the present invention, employing the Karl Fischer method. In practice, a cationically polymerizable composition for which the moisture content is to be determined is rehumidified at 19° C. and 30 percent relative humidity for at least 24 hours. The resulting cationically polymerizable composition is weighed at the same temperature and relative humidity. Thereafter, the moisture amount (by weight) of the cationically polymerizable composition is determined employing a Karl Fischer moisture meter. The moisture amount/the weight of the cationically polymerizable composition×100 is designated as the moisture content.

In the storage method of the actinic radiation curable type ink-jet ink comprising an oxetane ring containing compound of the present invention, as described above, it is characterized that the relationship of WP×WR/SR>6.65 is satisfied, wherein WR is the moisture content (in percent) of the aforesaid actinic radiation curable ink-jet ink; SR is the ratio (the void ratio) of the vacant space volume which is obtained by deducting the volume occupied by the actinic radiation curable ink from the interior volume of the aforesaid storage container to the interior volume of said storage container; and WP is the water vapor pressure (Pa) in the aforesaid vacant space. Further, in order to exhibit the effects of the present invention, it is preferable that WP×WR/SR is at least 13.4.

In the case in which the value of WP×WR/SR is less than 6.65, curability markedly varies depending on the ambient conditions during curing of ink ejected onto the substrate through exposure. The upper limit of this value is 665. The value which exceeds this is not preferred because the energy of the necessary actinic radiation for curing becomes excessively large.

In the present invention, in a container which is filled with the actinic radiation curable type ink and used for its storage, employed as methods for controlling the water vapor pressure in the empty portion may be the following methods described in JIS, namely which include the 2-point pressure method (JIS-B-7920-4.3 (1)), the 2-point temperature method (JIS-B-7920-4.3 (2)), the mixed method of the above 2-Point pressure method and 2-Point temperature method (JIS-B-7920-4.3 (3)), the flow dividing method (JIS-B-7920-4.3 (4)), and the saturated salt method (JIS-B-7920-4.3 (5)).

Containers according to the present invention, which are filled with an actinic radiation curable type ink-jet ink and used for its storage, refer to ink bottles employed for delivery from manufacturers to customers, main ink-feeding tanks arranged in ink-jet apparatuses, and ink sub-tanks which are arranged in the a liquid conveying system from the ink tank to the head. When ink storage is conducted in any of these storage containers beyond the conditions specified in the present invention, the storage stability of ink may be degraded, gelling may occur in the ink tank, and the liquid conveying pipe may be clogged.

The storage container of the present invention will now be detailed.

Types of storage container of the cationically polymerizable composition of the present invention are not particularly limited, and any type such as a bottle type, a cubic type, or a pillow type may be employed as long as it is comprised of at least one selected from substantially non-water permeable metal and glass, as well as a plastic material in which water-vapor permeability at a thickness of 25 μm is at most 20 g/m²·24 hours under 40° C., 90 percent relative humidity, and normal pressure. Containers may be formed employing a sheet comprised of plastics at a low water-vapor permeability, a sheet prepared by laminating the above sheet with a metal foil, or a sheet prepared by deposition of metal such as aluminum, or a laminated layer sheet prepared by adhering any of the above sheets onto another plastic material. Containers may be formed employing those sheets individually or in combinations.

Employed as specific materials of the storage container may be any of those which enable tight sealing. Listed as those may be glass, metal, or plastic containers. In view of durability, impact resistance, light weight, ease of conveyance, and cost, preferred are plastic containers.

Listed as plastic materials may be polyethylene (PE), polypropylene (PP), polystyrene (PS), polymethyl methacrylate (PMMA), biaxially oriented nylon 6, polyethylene terephthalate (PET), polycarbonate (PC), polyimide, and polyether styrene (PES).

Further, in the present invention, in view of achieving the desired water-vapor permeability, it is preferable to use materials at a low water-vapor permeability such as olefin based materials as well as fluorine-containing plastic materials.

Listed as such materials may be, for example, vinylidene chloride polymers, nylon 11, nylon 12, polychlorotrifluoroethylene, polytetrafluoroethylene, polyether ketone, and polyphenylene sulfide, as well as the above-mentioned polypropylene, low density polyethylene (LDPE), and high density polyethylene.

In the present invention, when plastic materials are employed as container materials, a critical condition is that at least one plastic material is employed which results in water-vapor permeability of at most 20 g/m²·24 hours at a thickness of 25 μm. Composite materials may also be employed which are comprised of a plurality of plastic materials, for example, described in "Kinosei Hosozairyo no Shin-tenkai (New Development of Functional Packaging Materials), (Toray Research Center, Co., Ltd.)". Further, it is required that a transparent flexible sheet is laminated onto the upper side or one side via an inorganic material evaporated layer and the innermost layer on at least one side is comprised of thermoplastic resins.

Listed as such inorganic material evaporated layers are inorganic layers described on pages 879-901 of Hakumaku (Thin Layer) Handbook (Nippon Gakujutsu Shinkokai or Japan Society of the Promotion of Science), pages 502-509, 612, and page 810 of Shinkuu Gijutsu (Vacuum Technology) Handbook (Nikkan Kogyo Shinbun, Ltd.), and pages 132-134 of Shinku (Vacuum) Handbook, Revised Edition (UL-VAC Nippon Shinku Gijutsu K.K.).

For example, employed are $Cr_2O_3$, $Si_xO_y$ (wherein x is 1 and y is 1.5-2.0), $Ta_2O_3$, ZrN, SiC, TiC, PSG, $Si_3N_4$, single crystal Si, amorphous Si, W, and $Al_2O_3$.

Listed as multilayered plastic sheets which are prepared by allowing a plurality of plastic sheets to adhere to each other may be, for example, a polyethylene terephthalate/polyvinyl alcohol-ethylene copolymer/polyethylene 3-layered sheet, a stretched polypropylene/polyvinyl alcohol-ethylene copolymer/polyethylene 3-layered sheet, a non-stretched polypropylene/polyvinyl alcohol-ethylene copolymer/polyethylene 3-layered sheet, a nylon/aluminum foil/polyethylene 3-layered sheet, a polyethylene terephthalate/aluminum foil/polyethylene 3-layered sheet, a cellophane/polyethylene/aluminum foil/polyethylene 4-layered sheet, an aluminum foil/paper/polyethylene 3-layered sheet, a polyethylene terephthalate/polyethylene/aluminum foil/polyethylene 4-layered sheet, a nylon/polyethylene/aluminum foil/polyethylene 4-layered sheet, a paper/polyethylene/aluminum foil/polyethylene 4-layered sheet, a polyethylene terephthalate/aluminum foil/polyethylene terephthalate/polypropylene 4-layered sheet, a polyethylene terephthalate/aluminum foil/polyethylene terephthalate/high density polyethylene 4-layered sheet, a polyethylene terephthalate/aluminum foil/polyethylene/low density polyethylene 4-layered sheet, a polyvinyl alcohol-ethylene copolymer/polypropylene 2-layered sheet, a polyethylene terephthalate/aluminum foil/polypropylene 3-layered sheet, and a paper/aluminum foil/polyethylene 3-layered sheet. Listed as particularly preferred sheets may be a polyethylene/polyvinylidene chloride coated nylon/polyethylene/ethylvinyl acetate-polyethylene condensation product 4-layered sheet, a polyethylene/polyvinylidene chloride coated nylon/polyethylene 3-layered sheet, an ethylvinyl acetate-polyethylene condensation product/polyethylene/aluminum evaporated nylon/polyethylene/ethylvinyl acetate-polyethylene condensation product 5-layered sheet, an aluminum evaporated nylon/nylon/polyethylene/ethylvinyl acetate-polyethylene condensation product 4-layered sheet, a stretched polypropylene/polyvinylidene chloride coated nylon/polyethylene 3-layered sheet, a polyethylene/polyvinylidene chloride coated nylon/polyethylene/polyvinylidene chloride coated nylon/polyethylene 5-layered sheet, a stretched polypropylene/polyvinyl alcohol-ethylene copolymer/low density polyethylene 3-layered sheet, a stretched polypropylene/polyvinyl alcohol-ethylene copolymer/non-stretched polypropylene 3-layered sheet, a polyethylene terephthalate/polyvinyl alcohol-ethylene copolymer/low density polyethylene 3-layered sheet, a stretched nylon/polyvinyl alcohol-ethylene copolymer/low density polyethylene 3-layered sheet, and a non-stretched nylon/polyvinyl alcohol-ethylene copolymer/low density polyethylene 3-layered sheet.

In the present invention, storage containers which are comprised of materials of which water-vapor permeability is at most 20 g/m²·24 hours at a thickness of 25 µm specified in the present invention are prepared employing the above-mentioned materials upon being appropriately selected. Further, the storage container of the present invention may be a single type. However, if desired, for example, a type may be employed in which a cationically polymerizable composition is placed in a bottle type container and subsequently the exterior is sealed by a moisture-proof sheet comprised of a multilayered plastic sheet.

The storage method of the cationically polymerizable composition of the present invention is characterized in that the cationically polymerizable composition is stored at a moisture content of at least 0.2 percent by weight.

When placed in a low water-vapor permeability container, methods to control the moisture content of the cationically polymerizable composition to be at 0.2 or more percent by weight are not particularly limited. However, in the present invention, preferred methods include one in which when the cationically polymerizable composition is prepared, a specified amount of water is added, or another in which a cationically polymerizable composition is placed in a storage container, the ambient humidity condition is controlled.

The cationically polymerizable composition according to the present invention will now be described.

The cationically polymerizable composition according to the present invention comprises at least an acid generating agent and a cationically polymerizable compound.

Initially, cationically polymerizable compounds employed in the present invention will be described.

In the present invention, one of the features is that cationically polymerizable compounds are employed as a photopolymerizable compound. Employed as cationically polymerizable monomers may be any of the various cationically polymerizable monomers known in the art. For example, listed are epoxy compounds, vinyl ether compounds, and oxetane compounds exemplified in JP-A Nos. 6-9714, 2001-31892, 2001-40068, 2001-55507, 2001-310938, and 2001-220526.

Among epoxy compounds, preferable aromatic epoxy compounds are di- or poly-glycidyl ether, which is synthesized by the reaction of polyhydric phenol having at least one aromatic core or alkylene oxide-added polyhydric phenol and epichlorohydrin, and for example, di- or poly-glycidyl ether of bisphenol A or of alkylene oxide-added bisphenol A, di- or poly-glycidyl ether of hydrogenated bisphenol A or of alkylene oxide-added hydrogenated bisphenol A, and novolak type epoxy resin, are listed. Herein, as alkylene oxide, ethylene oxide and propylene oxide are listed.

As alicyclic epoxide, a cyclohexene oxide or cyclopentene oxide, which is obtained by epoxidation of the compound having cycloalkane ring such as at least one cyclohexene or cyclopentene ring by the appropriate oxidant such as hydrogen peroxide or peracid, is preferable.

As a preferable aliphatic epoxide, there is di- or poly-glycidyl ether of aliphatic polyvalent alcohol or of alkylene oxide-added aliphatic polyvalent alcohol, and as its representative example, di-glycidyl ether of alkylene glycol such as di-glycidyl ether of ethylene glycol, di-glycidyl ether of propylene glycol and glycidyl ether of 1, 6-hexane diol, poly-glycidyl ether of polyvalent alcohol such as di- or tri-glycidyl ether of glycerin or of alkylene oxide added glycerin, and di-glycidyl ether of polyalkylene glycol such as di-glycidyl ether of polyethylene glycol or of alkylene oxide-added polyethylene glycol, and di-glycidyl ether of polypropylene glycol or of alkylene oxide-added polypropylene glycol, are listed. Herein, as alkylene oxide, ethylene oxide and propylene oxide are listed.

In these epoxides, when the quick hardening ability is considered, aromatic epoxide and alicyclic epoxide are preferable, and particularly, alicyclic epoxide is preferable. In the present invention, on kind of the above epoxides may be solely used, and more than 2 kinds of them may also be used by appropriately being combined.

(Vinyl Ether Compound)

Also as a vinyl ether compound preferably used in the ink of the present invention, publicly known vinyl ether compounds can be used, and for example, di or tri-vinyl ether compound, such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, or mono vinyl ether compound, such as ethyl vinyl ether, n-butyl vinyl ether, iso-butyl vinyl ether, octadecyl vinyl ether, cyclohexyl vinyl ether, hydroxy butyl vinyl ether, 2-ethyl-hexyl vinyl ether, cyclo-hexane di-methanol mono-vinyl ether, n propyl vinyl ether, iso-propyl vinyl ether, iso-propenyl ether-o-propylene carbonate, dodecyl vinyl ether, or di-ethylene glycol mono vinyl ether vinyl ether, is listed.

In these vinyl ether compounds, when the hardenability, adhesion or surface hardness is considered, di or tri-vinyl ether compound is preferable, and particularly di-vinyl ether compound is preferable. In the present invention, one kind of the above vinyl ether compounds may also be used, and more than two kinds of them may also be used by being appropriately combined.

In order to prevent shrinkage of ink after being hardened, it is preferable to incorporate an oxetane compound into the ink as a photo polymerizable compound.

The oxetane compound in the present invention is the compound having the oxetane ring, and all oxetane compounds which are publicly known as introduced in Japanese Unexamined Patent Application Publication No. 2001-220526, and Japanese Unexamined Patent Application Publication No. 2001-310939, can be used.

As the oxetane compound used in the present invention, the oxetane compounds having 1 to 4 oxetane rings is preferably used. By selecting the oxetane compound used in the invention from the oxetane compounds having 1 to 4 oxetane rings, the viscosity and the glass transition temperature of the ink can be optimized, and it results in that the handling easiness of the ink composition is improved and the ink having a sufficient stickiness can be obtained.

Specific example of the compounds having the oxetane ring according to the present invention will be described below, however, the present invention is not limited to them.

As an example of the compound having one oxetane ring in the molecule, the compounds shown by the following General Formula (1) are listed.

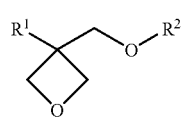

General Formula (1)

In the General Formula (1), $R^1$ is a hydrogen atom, alkyl group having 1-6 carbon atoms such methyl group, ethyl group, propyl group or butyl group, fluoroalkyl group having 1 to 6 carbon atoms, allyl group, aryl group, furyl group, or thienyl group. $R^2$ is an alkyl group having 1 to 6 carbon atoms such as methyl group, ethyl group, propyl group or butyl group; alkenyl group having 2 to 6 carbon atoms such as 1-propenyl group, 2-propenyl group, 2-methyl-1-propenyl group, 2-methyl-2-propenyl group, 1-butenyl group, 2-butenyl group or 3-butenyl group; a group having aromatic ring such as phenyl group, benzyl group, fluorobenzyl group, methoxy-benzyl group or phenoxy-ethyl group; alkyl carbonyl group having 2 to 6 carbon atoms such as ethyl carbonyl group, propyl carbonyl group or butyl carbonyl group; alkoxy carbonyl group having 2 to 6 carbon atoms such as ethoxy carbonyl group, propoxy carbonyl group or butoxy carbonyl group; N-alkyl carbamoyl group having 2 to 6 carbon atoms such as ethyl carbamoyl group, propyl carbamoyl group, butyl carbamoyl group or pentyl carbamoyl group. As the oxetane compound used in the present invention, it is particularly preferable that the compound having one oxetane ring is used, because the obtained composition is excellent in the coking property, and the operability is excellent in the low viscosity.

As the compound having two oxetane rings, the compounds shown by the following General Formula (2) are listed.

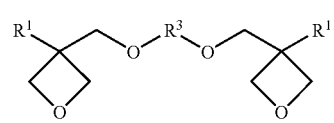

General Formula (2)

In the General Formula (2), $R^1$ is the same group as the group shown in the above-described General Formula (1A). $R^3$ is, for example, a linear or branching alkylene group such as ethylene group, propylene group or butylene group; linear or branching poly (alkylene-oxy) group such as poly (ethylene oxy) group or poly (propylene oxy) group; linear or branching un-saturated hydrocarbon group such as propenylene group, methyl propenylene group or butenylene group; carbonyl group; alkylene group including carbonyl group; alkylene group including carboxyl group; alkylene group including carbamoyl group.

Further, $R^3$ may also be a multivalent group selected from the group shown by the following General Formulas (3), (4) and (5).

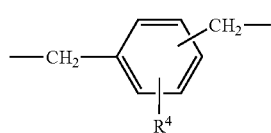

General Formula (3)

In the General Formula (3), $R^4$ is a hydrogen atom, an alkyl group having 1 to 4 carbon atoms such as methyl group, ethyl group, propyl group or butyl group, or alkoxy group having 1 to 4 carbon atoms such as methoxy group, ethoxy group, propoxy group or butoxy group, or halogen atom such as chloride atom or bromine atom, nitro group, cyano group, mercapto group, lower alkyl carboxyl group such as the group having 1 to 5 carbon atoms, carboxyl group, or carbamoyl group.

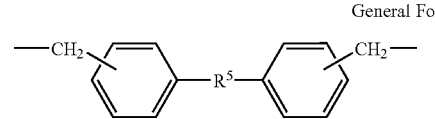

General Formula (4)

In the General Formula (4), $R^5$ is oxygen atom, sulfide atom, methylene group, —NH—, —SO—, —SO$_2$—, —C(CF$_3$)$_2$—, or —C(CH$_3$)$_2$—.

General Formula (5)

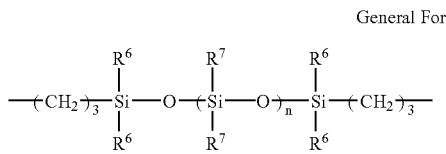

In the General Formula (5), $R^6$ is an alkyl group having 1 to 4 carbon atoms such as methyl group, ethyl group, propyl group or butyl group, or aryl group. Numeral n is an integer of 0-2000. $R^7$ is an alkyl group having 1 to 4 carbon atoms such as methyl group, ethyl group, propyl group or butyl group, or aryl group. $R^7$ is also a group selected from the group shown by the following General Formula (6).

General Formula (6)

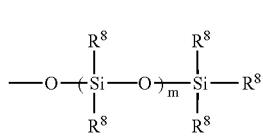

In the General Formula (6), $R^8$ is an alkyl group having 1 to 4 carbon atoms such as methyl group, ethyl group, propyl group or butyl group, or aryl group. Numeral m is an integer of 0-100.

As a specific example of the compound having 2 oxetane rings, the compounds shown by the following structural formulas are listed.

Exemplified compound 1

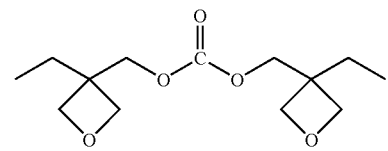

Exemplified compound 2

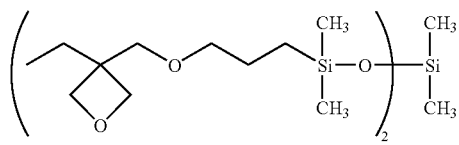

Exemplified compound 1 shown by the above structural formula is a compound in which $R^1$ is an ethyl group, and $R^3$ is a carboxy group in General Formula (2A).

Exemplified compound 2 shown by the above structural formula is a compound in which each $R^6$ and $R^7$ are a methyl group, and n is 1 General Formula (5).

Among the compound having 2 oxetane rings, as a preferable example except for the above-described compounds, there are compounds shown by the following General Formula (7). In the General Formula (7), $R^1$ is the same group as in the General Formula (1).

General Formula (7)

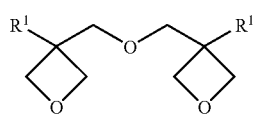

As the compounds having 3-4 oxetane rings, the compounds shown in the following General Formula (8) are listed.

General Formula (8)

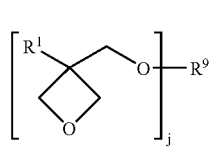

In the General Formula (8), $R^1$ is the same group as in the General formula (1). $R^9$ is, for example, branching alkylene group having 1 to 12 carbon atoms shown by the following General Formulas (A)-(C) below, branching poly(alkylene oxy) group such as group shown by the following General Formula (D), or branching polysiloxane group such as group shown by the following General Formula (E) is listed. Numeral j is 3 or 4.

A

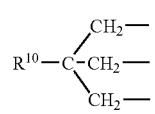

B

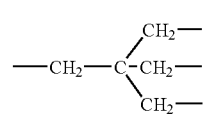

C

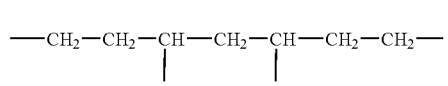

D

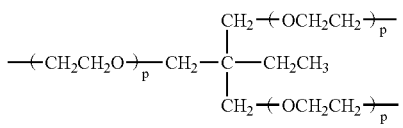

E

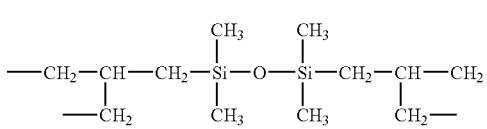

In Formula A, $R^{10}$ is a lower alkyl group such as a methyl, ethyl, or propyl group. In Formula D, p is an integer of 1 to 10.

As the specific example of the compound having 3 to 4 oxetane rings, the compound shown in the following Exemplified compound 3 is cited.

Exemplified compound 3

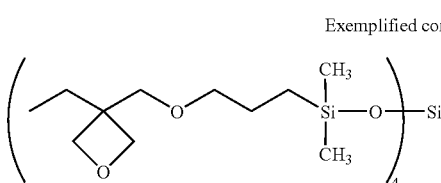

Furthermore, as an example of the compounds having 1-4 oxetane rings except the above examples, there are compounds shown in the following General Formula (9).

General Formula (9)

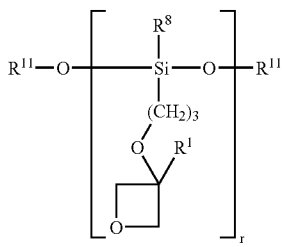

In the General Formula (9), R1 is the same group as in General Formula (1) and $R^8$ is the same group as in the General Formula (6). $R^{11}$ is alkyl group having 1 to 4 carbon atoms such as methyl group, ethyl group, propyl group or butyl group, or tri-alkyl silyl group, and numeral r is 1-4.

As preferable specific examples of the oxetane compounds used in the present invention, there are compounds shown below.

Exemplified compound 4

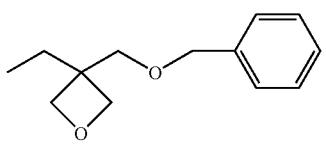

Exemplified compound 5

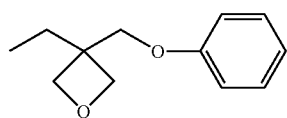

Exemplified compound 6

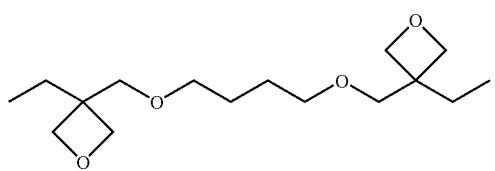

The production method of the compounds having the oxetane ring is not particularly limited, and it may be conducted according to the conventionally known method, and for example, there is a synthetic method of an oxetane ring from diol disclosed by Pattison (D. B. Pattison, J. Am. Chem. Soc., 3455, 79 (1957)).

Further, other than them, compounds having 1-4 oxetane rings, which have high molecular weight of molecular weight of about 1000-5000, are also listed. As an example of them, for example, the following compounds are listed.

p:20~200

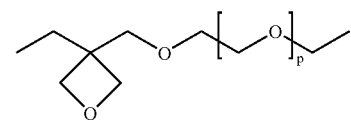

q:15~100

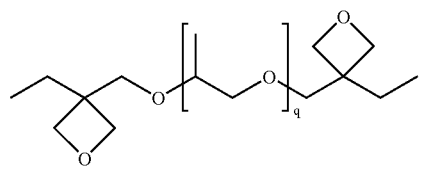

s:20~200

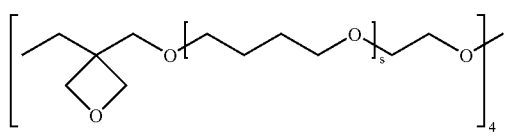

One of the features of the cationic polymerizable composition of the present invention is that it contains at least one acid generating agent (hereafter, it is called also as a photoinitiator).

In the present invention, it is preferable to incorporate an acid generating agent known in the art so as to effectively proceed the hardening reaction.

As the photo acid generator, for example, a chemical amplification type photo resist or compound used for the light cationic polymerization is used (Organic electronics material seminar "Organic material for imaging" from Bunshin publishing house (1993), refer to page 187-192). Examples preferable for the present invention will be listed below.

Firstly, aromatic onium compound $B(C_6F_5)_4^-$, $PF_6^-$, $AsF_6^-$, $SbF_6^-$, $CF_3SO_3^-$ salt, such as diazonium, ammonium, iodonium, sulfonium, phosphonium, can be listed.

Specific examples of the onium compounds will be shown below.

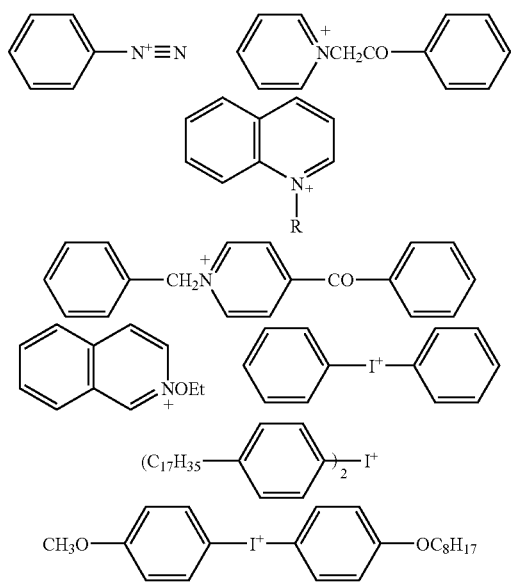

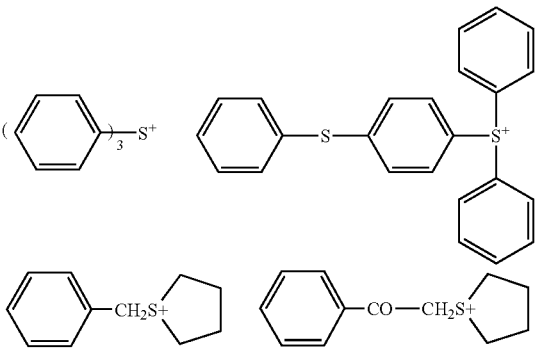

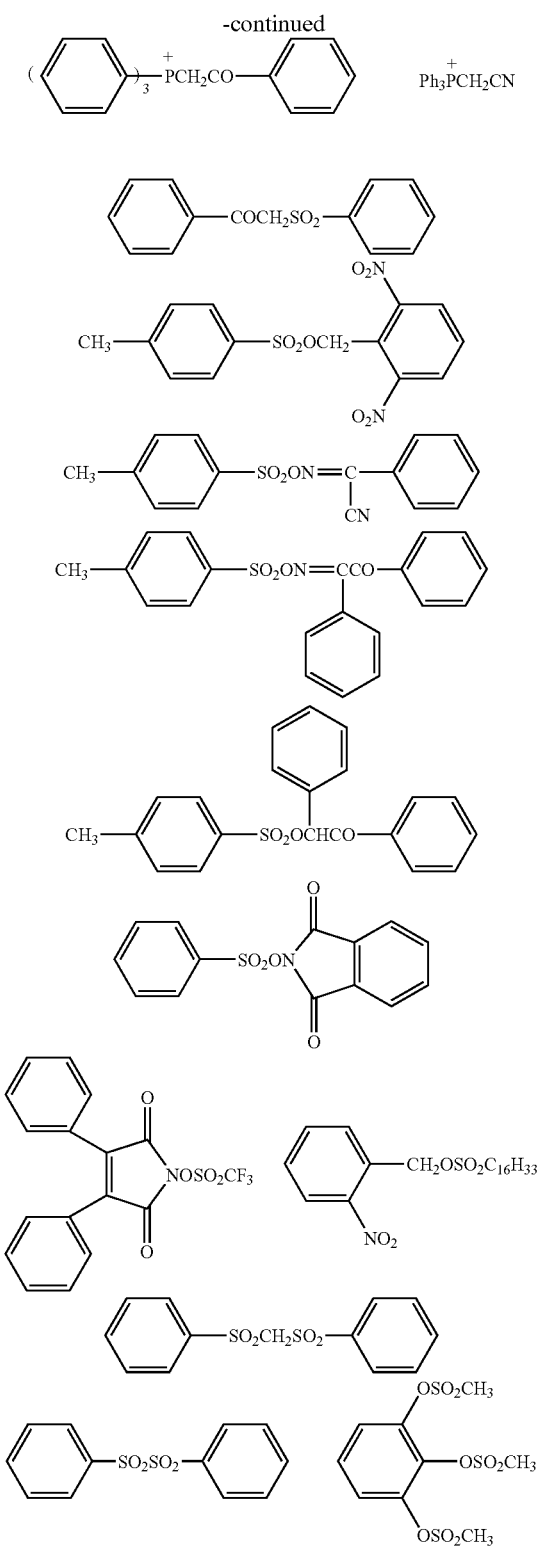

Secondly, sulfone compounds, which generate sulfonic acid, can be listed. Examples of specific compounds will be shown below.

Thirdly, a halide compound which generates hydrogen halide can also be used. Examples of specific compounds will be shown below.

Fourthly, iron π-complexes (ferrocenes) can be listed.

Further, the photo curable composition of the present invention is cured by exposure to ultraviolet rays. In order to more efficiently conduct such curing reaction, it is possible to simultaneously use photosensitizers. Examples of such photosensitizers include amines such as triethanolamine, methyldiethanolamine, triisopropanolamine, methyl 4-dimethylaminobenzoate, isoamyl 4-dimethlaminobenzoate, ethyl 2-diethylaminobenzoate, n-butoxyethyl 4-dimethylaminobenzoate, and 2-ethylhexyl 4-dimethylaminobenzoate, cyanine, phthalocyanine, merocyanine, porphyrin, spiro compounds, ferrocene, fluorene, flugide, imidazole, perylene, phenazine, phenothiazine, polyene, azo compounds, diphenylmethane, triphenylmethane, polymethine acridine, coumarin, ketocoumarin, quinacridone, indigo, styryl, pyrylium compounds, pyrromethene compounds, pyrazolotriazole compounds, benzothiazole compounds, barbituric acid derivatives, and thiobarbituric acid derivatives. Further, employed are compounds described in European Patent No. 568,993, U.S. Pat. Nos. 4,508,811 and 5,227,227, and Japanese Patent Application Open to Public Inspection Nos. 2001-125255 and 11-271969. The used amount of photosensitizers is preferably in the range of 0.01-10.00 percent by weight in the actinic radiation curable composition.

In order to color an active ray curable resin composition or an ink-jet ink of the present invention, colorants may be added thereto.

As the colorants in the present invention are, the colorants, which can be solved or dispersed in main component of the polymeric compound, can be used, however, from the viewpoint of weather fastness, the pigment is preferable.

Listed as pigments usable in the cationically polymerizable composition according to the present invention may be either achromatic inorganic pigments such as carbon black, titanium oxide, or calcium carbonate, or chromatic organic pigments. Examples of organic pigments include insoluble azo pigments such as toluidine red, toluidine maroon, Hansa yellow, benzidine yellow, or pyrazolone red; soluble azo pigments such as Lithol red, helio Bordeaux, pigment scarlet, or permanent red 2B; derivatives of vat dyes such as alizarin, indanthron, or thioindigo maroon; phthalocyanine based organic pigments such as phthalocyanine blue or phthalocyanine green; quinacridone based organic pigments such as quinacridone red or quinacridone magenta; perylene based organic pigments such as perylene red and perylene scarlet; isoindolinone based organic pigments such as isoindolinone yellow or isoindolinone orange; pyranthrone based organic pigments such as pyranthrone red or pyranthrone orange; thioindigo based organic pigments; condensation azo based organic pigments; benzimidazolone based organic pigments; quinophthalone based organic pigments such as quinophthalone yellow; isoindoline based organic pigments such as isoindoline yellow; and other pigments such as flavanthrone yellow, acrylamide yellow, nickel azo yellow, copper azomethine yellow, perynone orange, anthrone orange, dianthraquinonyl red, or dioxazine violet.

When organic pigments are represented by Color Index (C.I.) numbers, examples include C.I. Pigment Yellow 12, 13, 14, 17, 20, 24, 74, 83, 86, 93, 109, 110, 117, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 146, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Of the above pigments, preferred are quinacridone based organic pigments, phthalocyanine based organic pigments, benzimidazolone based organic pigments, isoindolinone based organic pigments, condensation azo based organic pigments, quinophtharone based organic pigments, and isoindolinone based organic pigments, since they result in excellent lightfastness.

To disperse the pigment, a ball mill, sand mill, attritor, roll mill, agitator, Henschel mixer, colloid mill, ultrasonic homogenizer, Pearl mill, wet jet mill, or paint shaker may be used. Further, when the pigment is dispersed, the dispersing agent can also be added. It is preferable that, as the dispersing agent, high polymeric dispersing agent is used. As the high polymeric dispersing agent, Solsperse series of Avecia co., is cited.

Further, as the dispersion auxiliary agent, the synergist corresponding to each kind of pigment can also be used. It is preferable that 1-50 parts by weight of these dispersing agent and dispersion auxiliary agent are added to 100 parts by weight of the pigment. The dispersion medium is solvent or polymeric compound, and it is preferable that the ultraviolet ray-curable ink used in the present invention comprises no-solvent, because it is reacted and hardened just after the arrival of the ink. When the solvent remains in the hardened image, the problem of deterioration of solvent resistance and VOC (Volatile Organic Compound) of the remained solvent is raised. Accordingly, it is preferable in the dispersion aptitude that the dispersion medium is not solvent, but polymeric compounds, and the monomer in which the viscosity is lowest in them, is selected.

When the dispersion is conducted, it is preferable to configure the pigment, dispersing agent, selection of diluent for the dispersion so that average particle size of the pigment become 0.08-0.5 μm, more preferably 0.3-10 μm, still more preferably, 0.3-3 μm. By this particle size control, the nozzle plugging of the ink-jet head is suppressed, and the preservation stability of the ink, ink transparency and hardening sensitivity can be maintained.

It is preferable for the colorant that the addition amount is 1 weight % to 10 weight % of the whole of the ink.

It is possible to incorporate into the cationically polymerizable composition, according to the present invention, various additives other than those described above. For example, added may be leveling agents, matting agents, as well as polyester based resins, polyurethane based resins, vinyl based resins, acryl based resins, rubber based resins, and waxes for controlling physical layer properties. Further, for the purpose of improving storage stability, it is possible to use any of the basic compounds known in the art. Listed as representatives are basic alkaline metal compounds, basic alkaline earth metal compounds, as well as basic organic compounds such as amines. By combining radically polymerizable monomers with initiators, it is possible to form a radical-cationic hybrid type composition.

EXAMPLES

The present invention will now be described with reference to examples. However, the embodiments of the present invention are not limited thereto.

Example 1

<<Preparation of Cationically Polymerizable Composition>>

The cationically polymerizable composition constituted as described below was prepared.

| | |
|---|---|
| Cationically polymerizable compound (oxetane compound Aron Oxetane OXT-221, manufactured by Toagosei Co., Ltd.) | 70 weight parts |
| Cationically polymerizable compound (alicyclic epoxy compound, CEL 2021P, manufactured by Dicel Chemical Industries. Ltd.) | 30 weight parts |
| Acid generating compound (Adeka Optomer SP-152 (manufactured by Asahi Denka Co., Ltd.) | 5 weight parts |
| N-ethyldiethanolamine | 0.15 weight part |
| Water | 0.5 weight part |

While stirring, components listed as above were successively added and mixed under light-shielded ambience, whereby a cationically polymerizable composition was prepared.

The moisture content of the resulting cationically polymerizable composition was determined employing the Karl Fischer method, resulting in 0.7 percent by weight.

<<Preparation of Samples>>

(Preparation of Sample 1)

The cationically polymerizable composition, prepared as above, was placed in a container made of LDPE (being low density polyethylene) under an ambience of 0.09 percent absolute humidity and 23° C., and the container was tightly sealed employing a lid made of the same material, whereby Sample 1 was prepared.

The water-vapor permeability of LDPE employed in Sample 1 was determined employing the method specified in JIS Z 0208, resulting in 19/m$^2$·24 hours (at 4° C. and 90 percent relative humidity) at a thickness of 25 μm).

(Preparation of Samples 2-9)

Samples 2-9 were prepared in the same manner as Sample 1, except that the materials of the container and lid, and the moisture content of the cationically polymerizable composition, when placed into the container, were varied as described in Table 1.

Incidentally, when prepared as above, the moisture content of the above cationically polymerizable composition was 0.16 percent under the condition of non-water addition.

Further, abbreviation of materials described in Table 1 is as follows.

LDPE: low density polyethylene

HDPE: high density polyethylene

PP: polypropylene

Ny 1: nylon 12

ETFE: tetrafluoroethylene-ethylene copolymer

PET: polyethylene terephthalate (Preparation of Sample 10)

Sample 10 was prepared in such a manner that the whole exterior of the container of Sample 9, prepared as above, was tightly sealed employing Moisture-proof Sheet 1.

(Moisture-Proof Sheet 1)

<Layer Configuration>
VMPET12//VMPET12//PET12//Sealant Film

<Configuration Components>
PET: polyethylene terephthalate
Sealant Film: thermally fusible film comprised of CPP (casting polypropylene) or LLDPE (low density linear polyethylene)

Above "//" means a dry lamination adhesion layer in which the adhesive layer thickness is 2.5 μm. The adhesive used for dry lamination was a 2-liquid reactive type urethane based adhesive.

(Preparation of Sample 11)

Sample 11 was prepared in the same manner as aforesaid Sample 10, except that when a cationically polymerizable composition was placed in the container, the moisture content of the cationically polymerizable composition was changed from 0.60 percent by weight to 0.15 percents by weight.

(Preparation of Sample 12)

Sample 12 was prepared in the same manner as aforesaid Sample 10, except that Moisture-proof Sheet 1 was replaced with Moisture-proof Sheet 2 of which configuration-was varied as described below.

(Moisture-Proof Sheet 2)

<Layer Configuration>
VMPET5//VMPET5//PET5//Sealant Film

<<Evaluation of Stored Samples>>

Each of the samples prepared as above was stored at high temperature and low humidity, namely at 60° C. and 20 percent relative humidity, for 7 days. Viscosity and moisture content was determined just after placement in the container, after 3-day storage, and 7-day storage. Table 1 shows the results.

Viscosity was determined at 25° C. and a shear rate of 1,000 sec-1, employing a vibration type viscosimeter (VISCOMATE VM-1G-MH, manufactured by YAMAICHI Co., Ltd.). Further, the moisture content was determined employing the Karl Fischer method.

TABLE 1

| Sample No. | Container Material | Container Water-vapor Permeability (*1) | Outer Package Material Moisture-proof Sheet | Outer Package Material Water-vapor Permeability (*1) | During Filling Container Moisture Content (%) | During Filling Viscosity (mPa·s) | After 3 Days Moisture Content (%) | After 3 Days Viscosity (mPa·s) | After 7 Days Moisture Content (%) | After 7 Days Viscosity mPa·s | Remarks |
|---|---|---|---|---|---|---|---|---|---|---|---|
| 1 | LDPE | 19 | — | — | 1.50 | 22.7 | 0.70 | 22.9 | 0.25 | 26.8 | Inv. |
| 2 | LDPE | 19 | — | — | 0.16 | 22.7 | 0.10 | gelled | 0.02 | impossible to measure | Comp. |
| 3 | HDPE | 5 | — | — | 1.50 | 22.7 | 1.50 | 22.8 | 1.41 | 22.8 | Inv. |
| 4 | HDPE | 5 | — | — | 0.60 | 22.7 | 0.60 | 22.8 | 0.45 | 23.1 | Inv. |
| 5 | HDPE | 5 | — | — | 0.16 | 22.7 | 0.16 | 65.0 | 0.16 | 210 | Comp. |
| 6 | PP | 15 | — | — | 1.50 | 22.7 | 0.90 | 22.9 | 0.57 | 23.0 | Inv. |
| 7 | ETFE | 5 | — | — | 1.50 | 22.7 | 1.50 | 22.8 | 1.39 | 22.9 | Inv. |
| 8 | Nyl | 1 | — | — | 0.60 | 22.7 | 0.60 | 22.8 | 0.55 | 22.9 | Inv. |
| 9 | PET | 45 | — | — | 0.60 | 22.7 | 0.15 | 54.0 | 0.10 | gelled | Comp. |
| 10 | PET | 45 | 1 | less than 1.0 | 0.60 | 22.7 | 0.55 | 22.8 | 0.50 | 22.8 | Inv. |
| 11 | PET | 45 | 1 | less than 1.0 | 0.15 | 22.7 | 0.15 | 54.0 | 0.10 | gelled | Comp. |
| 12 | PET | 45 | 2 | less than 1.0 | 0.60 | 22.7 | 0.55 | 22.8 | 0.50 | 22.9 | Inv. |

*1: $g/m^2 \cdot 24$ hours (40° C., 90% relative humidity, thickness of 25 μm)
Inv.: Present Invention
Comp.: Comparative Example VMPET: alumina-evaporated PET (commercially available product, manufactured by Toyo Metallizing Co., Ltd.)

The figure following each resin represents film thickness (μm).

As can clearly be seen from Table 1, the storage methods of the present invention, in which the cationic polymerizable composition was stored at a moisture content of at least 0.2 percent by weight in a container comprised of plastic materials of a water-vapor permeability of at most 20 $g/m^2 \cdot 24$ hours at a thickness of 25 μm under 40° C., 90 percent relative humidity, and normal pressure, exhibited that under storage at high temperature and low humidity, variation of viscosity and moisture content of the contained cationically polymerizable composition was minimized and liquid characteristics were stabilized. On the other hand, samples which were placed in storage containers comprised of materials of a water-vapor permeability of at least 20 g/m²·24 hours (at 40° C., 90 percent relative humidity, and a thickness of 25 μm), or comparative examples in which even though the storage container was comprised of materials of a water-vapor permeability of at most 20 g/m²·d (at 40° C., 90 percent relative humidity, and a thickness of 25 μm), the moisture content of the cationically polymerizable composition was at most 0.2 percent by weight, exhibited viscosity variation due to storage at high temperature and low humidity.

According to the present invention, it is possible to provide a storage method of a cationically polymerizable composition useful for ink-jet ink and flexographic ink which require low viscosity as well as minimal viscosity variation, and a storage container used for the same.

Example 2

<<Preparation of Inks>>

(Preparation of Inks 1 to 6)

The pigment (P1), dispersing agent (S32000), oxetane ring containing compound (OX211), oxysilane group containing compound (CEL2021P), and vinyl ether compound (DVE-3), described in Table 2, were placed in a sand mill and dispersed over a period of 4 hours, whereby a stock liquid composition for each of the actinic radiation curable type inks was prepared. Subsequently, a cationic photopolymerization initiator (SP-152) was added to the stock liquid composition for each ink, and the resulting mixture was slowly stirred until the cationic photopolymerization initiator was dissolved. Thereafter, water was added and the resulting mixture was subjected to pressure filtration employing a membrane filter, whereby Actinic Radiation Curable Type Ink-jet Inks 1 to 6 were prepared.

The moisture content of each of the inks prepared as above was determined employing a Karl Fischer apparatus (Automatic Moisture Measurement Apparatus AQV-2000, manufactured by Hiranuma Sangyo Co., Ltd.

("Polyethylene Glycol 300", manufactured by Tokyo Kasei Co., Ltd.), and the resulting mixture was kneaded for 3 hours. Subsequently, the resulting mixture was charged into 2.5 L of heated water and stirred for approximately one hour employing a high speed mixer while heated at approximately 80° C., whereby a slurry was formed. Thereafter, filtration and water washing were repeated 5 times, and sodium chloride and the solvent were removed. Subsequently, drying was carried out employing spray dry, and the resulting product was designated as Pigment P1.

Oxetane ring containing compound (OXT-221): di[1-ethyl (3-oxetanyl)]methyl ether, manufactured by Toagosei Co., Ltd.

Oxirane group containing compound (CEL2021p): alicyclic epoxy compound, manufactured by Daicel Chemical Industries, Ltd.

Vinyl ether compound (DVE-3): triethylene glycol divinyl ether, manufactured by ISP Co.

Pigment dispersing agent (S32000): aliphatic modified dispersing agent Solsperse 32000, manufactured by Zeneca Corp.

Cationic photopolymerization initiator (SP-152: triphenylsulfonium salt, Adekaoptomer SP-152, manufactured by Asahi Denka Co., Ltd.

<<Storage of Heated Ink>>

Each of Inks 1-6 prepared as above, at a moisture content of WR described in Table 1, was placed in an ink container or an ink tank of the ink-jet apparatus, which were stored in a 70° C. thermostat under the storage conditions of void ratio SR and water vapor pressure Pa (kPa) described in Table 3 for one week, whereby Inks 1A-6A (stored in the storage container) and 1B -6B (stored in the ink tank), which were stored upon being heated were prepared.

Incidentally, each heading described in Table 3 is detailed below.

<Storage Conditions>

Storage Container 1: aluminum evaporated polyethylene storage container

Storage Container 2: polyethylene storage container

Ink Tank 1: glass ink tank

TABLE 2

| Ink No. | Pigment P1 | Oxetane Ring Compound OXT221 | Oxirane Ring Compound CEL2021P | Vinyl Ether Compound DVE-3 | Pigment Dispersing Agent S32000 | Cationic Photo-polymerization Initiator SP-152 | Water | Moisture Content (%) |
|---|---|---|---|---|---|---|---|---|
| 1 | 5 | 70 | 30 | — | 3 | 5 | 0.2 | 0.5 |
| 2 | 5 | 70 | 30 | — | 3 | 5 | 0.7 | 1.0 |
| 3 | 5 | 60 | 30 | 10 | 3 | 5 | 1.7 | 2.0 |
| 4 | 5 | 70 | 30 | — | 3 | 5 | 1.7 | 2.0 |
| 5 | 5 | 70 | 30 | — | 3 | 5 | 0.7 | 1.0 |
| 6 | 5 | 60 | 30 | 10 | 3 | 5 | 0.2 | 0.5 |

*: Numeral values are in parts by weight.

Each of the additives described in Table 2 is detailed as follows.

Pigment (P1): Charged into a 5.55 L (1 gallon) kneader made of styrene (manufactured by Inoue Mfg., Inc.) were crude copper phthalocyanine ("Copper Phthalocyanine", manufactured by Toyo Ink Mfg. Co., Ltd.), 2,500 parts of sodium chloride, and 160 parts of polyethylene glycol Ink Tank 2: polyethylene ink tank <Control Means of Water Vapor Pressure>

Water vapor pressure was controlled employing each of the saturated inorganic salt solutions described below. Each of the above solutions which was placed in the storage container or the empty portion of the ink tank was connected with an aluminum evaporated polyethylene hose.

1: Water vapor pressure was controlled employing an aqueous saturated sodium chloride solution.

2: Water vapor pressure was controlled employing an aqueous potassium chloride saturated solution.

3: Water vapor pressure was controlled employing an aqueous saturated magnesium chloride solution.

4: Water vapor pressure was controlled employing an aqueous saturated magnesium sulfate solution.

5: Water vapor pressure was controlled employing an aqueous saturated lithium chloride solution.

(Evaluation of Ejection Stability)

Each of Ink 1A -6A and 1B -6B, which had been subjected to heated storage, was continuously ejected for 30 minutes employing the above-mentioned ink-jet recording apparatus. Thereafter, the presence of nozzle clogging was visually observed and the ejection stability was evaluated based on the criteria below.

A: continuous ejection for 30 minutes resulted in no nozzle clogging

B: continuous ejection for 30 minutes resulted in no nozzle clogging, but satellites were generated

TABLE 3

| Image No. | Ink No. | Moisture Content of Ink SR | Storage Condition 1 | Void Ratio SR | Water Vapor Pressure (kpa) WP | Cotrol Means of Water Vapor Pressure | WP × WR/SR | Remarks |
|---|---|---|---|---|---|---|---|---|
| 1A | 1 | 0.5 | Storage Container 1 | 0.1 | 3.18 | 1 | 15.9 | Inv. |
| 2A | 2 | 1.0 | Storage Container 1 | 0.1 | 1.36 | 3 | 13.6 | Inv. |
| 3A | 3 | 2.0 | Storage Container 2 | 0.1 | 0.46 | 5 | 9.20 | Inv. |
| 4A | 4 | 2.0 | Storage Container 1 | 0.5 | 0.46 | 5 | 1.84 | Comp. |
| 5A | 5 | 1.0 | Storage Container 1 | 0.1 | 0.46 | 5 | 4.60 | Comp. |
| 6A | 6 | 0.5 | Storage Container 2 | 0.1 | 0.46 | 5 | 2.30 | Comp. |
| 1B | 1 | 0.5 | Ink Tank 1 | 0.5 | 11.0 | 2 | 11.0 | Inv. |
| 2B | 2 | 1.0 | Ink Tank 2 | 0.5 | 6.12 | 4 | 12.2 | Inv. |
| 3B | 3 | 2.0 | Ink Tank 2 | 0.9 | 6.12 | 4 | 13.6 | Inv. |
| 4B | 4 | 2.0 | Ink Tank 1 | 0.5 | 0.46 | 5 | 1.84 | Comp. |
| 5B | 5 | 1.0 | Ink Tank 2 | 0.5 | 3.18 | 1 | 6.36 | Comp. |
| 6B | 6 | 0.5 | Ink Tank 2 | 0.9 | 6.12 | 4 | 3.40 | Comp. |

Inv.: Present Invention
Comp.: Comparative Example

<<Formation of Ink-jet Images>>

(Formation of Images 1A -6A and 1B -6B)

By employing an ink-jet recording apparatus comprising a piezo ink head, each of Inks 1A -6A and 1B -6B, which had been subjected to heated storage was used to print solid images onto a substrate (being a polyethylene terephthalate film) at the printing temperature shown in Table 3. Thereafter, curing was carried out at a substrate conveyance rate of 10 m/minute employing an ultraviolet radiation exposure device (one metal halide lamp at an output of 120 W), whereby each of Images 1A -6A and 1B -6B was formed.

<<Evaluation of Inks and Images>>

Inks prepared as above and formed images were evaluated for items described below.

(Evaluation of Dispersion Stability of Inks)

The state of liquid composition of each of Inks 1A -6A and 1B -6B prepared as above, which had been subjected to heated storage, was visually observed, and the dispersion stability of each ink was evaluated based on the criteria below.

A: no generation of precipitates was noted, and no viscosity varied

B: no generation of precipitates was noted, but the viscosity increased slightly C: generation of precipitates and coagulum was clearly noted C: continuous ejection for 30 minutes resulted in nozzle clogging (Evaluation of Curability)

With regard to each of the images prepared as above, the frequency of passage of the substrate through the ultraviolet radiation exposure device until tack was not felt by fingers (i.e., to the state of tack-free) was recorded and employed as a scale for curability. A decrease in the numerical value refers to a decrease in energy for curing and represents better curability.

(Evaluation of Layer Strength)

The surface of each of the images prepared as above was subjected to a finger nail scratching test, and the layer strength was evaluated based on the criteria below.

A: when scratched by finger nails, no peeling of the image from the substrate was noted B: when scratched by finger nails, partial peeling of the image from the substrate was noted C: when scratched by finger nails, the image was readily peeled from the substrate (Evaluation of Adhesion Property)

With regard to each of the solid images prepared as above, Cellotape (registered trade mark) was adhered onto a sample in which the surface of the solid image was not cut, as well as a sample in which, while being based on JIS K 5400, the printed image was subjected to crosswise cutting of 11 lines at an interval of 1 mm so that a lattice pattern consisting of 100 squares of 1 mm² was formed. Subsequently, the Cellotape was quickly peeled at an angle of 90 degrees, and printed images and the state of the unpeeled lattice pattern were evaluated based on the criteria below.
A: even in the lattice pattern test, no peeling of the printed image was noted
B: in the lattice pattern test, some peeling of the printed Image was noted, but when the image was not cut, peeling was rarely noted
C: under both conditions, peeling easily occurred employing Cellotape (registered trade mark)

(Evaluation of Solvent Resistance and Water Resistance)

Each of the printed image samples was separately immersed in alcohol and water at 50° C. for 10 seconds. Thereafter, image damage and the degree of contraction were visually evaluated, whereby the solvent resistance and water resistance were evaluated based on the criteria below.
A: no change was noted
B: slight damage and contraction were noted
C: damage and contraction were clearly noted
Table 4 shows the results.

TABLE 4

| Image No. | Temperature during Printing (° C.) | Ink Stability Evaluation | | Image Evaluation | | | | | Remarks |
|---|---|---|---|---|---|---|---|---|---|
| | | Dispersion Stability | Ejection Stability | Curability | Layer Strength | Adhesion Property | Solvent Resistance | Water Resistance | |
| 1A | 30 | A | A | 1 | A | A | A | A | Inv. |
| 2A | 30 | A | A | 1 | A | A | A | A | Inv. |
| 3A | 30 | A | A | 1 | A | A | A | A | Inv. |
| 4A | 30 | C | C | 2 | B | B | B | B | Comp. |
| 5A | 30 | C | C | 2 | B | B | B | B | Comp. |
| 6A | 30 | C | C | 2 | B | B | B | B | Comp. |
| 1B | 50 | A | A | 1 | A | A | A | A | Inv. |
| 2B | 50 | A | A | 1 | A | A | A | A | Inv. |
| 3B | 50 | A | A | 1 | A | A | A | A | Inv. |
| 4B | 50 | C | C | 2 | B | B | B | B | Comp. |
| 5B | 50 | C | C | 2 | B | B | B | B | Comp. |
| 6B | 50 | C | C | 2 | B | B | B | B | Comp. |

Inv.: Present Invention
Comp.: Comparative Example

As can clearly be seen from the results of Table 4, compared to the comparative examples, inks which were subjected to heated storage under conditions in which WP×WR/SR specified in the present invention exceeded 6.65, even though stored at high temperature over an extended period of time, exhibited excellent ink dispersion stability and ejection stability, and the formed images exhibited excellent curability, layer strength, and adhesion property, as well as excellent solvent resistance and water resistance.

What is claimed is:

1. A method for storing a cationic polymerizable composition comprising an acid generating agent, a cationic polymerizable compound and water, the method comprising the steps of:
   placing the cationic polymerizable composition in a water impermeable container; and
   maintaining a content of water in the cationic polymerizable composition at a level of 0.2-5.0 weight % based on the total weight of the cationic polymerizable composition,
   wherein the container is made of a water impermeable material selected from the group consisting of:
   (i) metals;
   (ii) glass; and
   (iii) plastics having a water-vapor permeability of less than or equal to 20 g/m²·24 hr measured at 40° C., 90% RH under 1 atmosphere for each plastic having a thickness of 25 μm.

2. The method for storing a cationic polymerizable composition of claim 1, wherein the cationic polymerizable compound is an oxetane compound.

3. A container for storing a cationic polymerizable composition containing an acid generating agent, a cationic polymerizable compound and water, a content of water in the cationic polymerizable composition being 0.2-5.0 weight % based on the total weight of the cationic polymerizable composition,
   wherein the container is made of a water impermeable material selected from the group consisting of:
   (i) metals;
   (ii) glass; and
   (iii) plastics having a water-vapor permeability of less than or equal to 20 g/m²·24 hr measured at 40° C., 90% RH under 1 atmosphere for each plastic having a thickness of 25 μm.

4. The method for storing the cationic polymerizable composition of claim 1,
   wherein the cationic polymerizable composition is a photo curable ink-jet ink containing a compound having an oxetane ring in the molecule; and
   the container and the ink-jet ink satisfy the following formula:

$$WP \times WR/SR > 6.65,$$

wherein WR represents a content of water in the ink-jet ink expressed in weight % based on the total weight of the ink-jet ink; SR represents a ratio of a volume of a portion in the container which is not occupied by the ink-jet ink to an inner volume of the container; and WP is a water-vapor pressure (Pa) of the portion in the container which is not occupied by the ink-jet ink.

5. The method for storing the photo curable ink-jet ink of claim 4, wherein the container and the ink-jet ink satisfy the following formula:

$$WP \times WR/SR > 13.4,$$

wherein WR represents a content of water in the ink-jet ink expressed in weight % based on the total weight of the ink-jet ink; SR represents a ratio of a volume of a portion in the container which is not occupied by the ink-jet ink to an inner volume of the container; and WP is a water-vapor pressure (Pa) of the portion in the container which is not occupied by the ink-jet ink.

6. The method for storing the photo curable ink-jet ink of claim 4, wherein the water-vapor pressure (Pa) of the portion in the container which is not occupied by the ink-jet ink is determined employing one of the methods of:
   (i) a two-point pressure method;
   (ii) a two-point temperature method;
   (iii) a flow dividing method; or
   (iv) a saturated salt method,
   the methods being defined in JIS B 7920.

7. The method for storing the photo curable ink-jet ink of claim 4, wherein the photo curable ink-jet ink contains a vinyl ether compound or a compound having an oxirane ring in the molecule.

8. The method for storing the photo curable ink-jet ink of claim 4, wherein the photo curable ink-jet ink contains a photo cationic polymerizable initiator.

9. The method for storing the photo curable ink-jet ink of claim 4, wherein the photo curable ink-jet ink contains a pigment and a dispersing agent for the pigment.

10. The method for storing the photo curable ink-jet ink of claim 9, wherein the pigment comprises microparticles having an average particle diameter of 10 to 150 nm.

11. The method for storing the photo curable ink-jet ink of claim 4, wherein the photo curable ink-jet ink has a viscosity of 5 to 50 mPa·s at 25° C.

12. An ink-jet recording apparatus employing the photo curable ink-jet ink stored according to the method of claim 4.

* * * * *